United States Patent
Steinmeyer

(10) Patent No.: US 6,762,522 B2
(45) Date of Patent: Jul. 13, 2004

(54) MAGNETIC BEARING FOR SUSPENDING A ROTATING SHAFT USING HIGH $T_C$ SUPERCONDUCTING MATERIAL

(75) Inventor: Florian Steinmeyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/363,425

(22) PCT Filed: Aug. 20, 2001

(86) PCT No.: PCT/DE01/03173

§ 371 (c)(1),
(2), (4) Date: Aug. 15, 2003

(87) PCT Pub. No.: WO02/18807

PCT Pub. Date: Mar. 7, 2002

(65) Prior Publication Data

US 2004/0021382 A1 Feb. 5, 2004

(30) Foreign Application Priority Data

Aug. 31, 2000 (DE) .......................... 100 42 962

(51) Int. Cl.⁷ ................................................ H02K 7/09
(52) U.S. Cl. ..................................... 310/90.5; 505/166
(58) Field of Search ............................. 310/90.5, 52.57, 310/64, 65; 505/166, 876, 877, 878, 903

(56) References Cited

U.S. PATENT DOCUMENTS

| | | | |
|---|---|---|---|
| 3,612,630 A | * 10/1971 | Rosensweig | 310/90.5 |
| 4,641,978 A | * 2/1987 | Kapich | 384/102 |
| 5,196,748 A | 3/1993 | Rigney | 310/90.5 |
| 5,214,981 A | 6/1993 | Weinberger et al. | 74/573 R |
| 5,220,232 A | 6/1993 | Rigney, II et al. | 310/90.5 |
| 5,330,967 A | * 7/1994 | Takahata et al. | 505/166 |
| 5,335,505 A | 8/1994 | Ohtani et al. | 62/6 |
| 5,633,548 A | * 5/1997 | Takahata et al. | 310/90.5 |
| 5,710,469 A | * 1/1998 | Ries | 310/90.5 |
| 6,199,867 B1 | * 3/2001 | Mahoney et al. | 277/410 |
| 6,367,241 B1 | * 4/2002 | Ress et al. | 60/784 |

FOREIGN PATENT DOCUMENTS

| | | |
|---|---|---|
| DE | 2034213 | 5/1971 |
| DE | 44 36 831 C2 | 6/1995 |
| DE | 196 43 844 C1 | 5/1998 |

* cited by examiner

Primary Examiner—Dang Le
(74) Attorney, Agent, or Firm—Staas & Halsey LLP

(57) ABSTRACT

A magnetic bearing magnetically suspends a rotating shaft within a stator. The magnetic bearing has a first bearing element rigidly linked with the shaft which is enclosed by a second bearing element pertaining to the stator, thereby defining a bearing clearance. A system of magnets of the first bearing element with permanent magnet elements and a cooled superconducting system of the second bearing element with high $T_c$ superconducting material are commonly enclosed by at least one insulating compartment. An additional compartment which is separate from the insulating compartment encloses the bearing clearance and partial compartments that radially extend on lateral sides of the superconducting system and of the system of magnets up to the shaft and are sealed from the shaft.

29 Claims, 1 Drawing Sheet

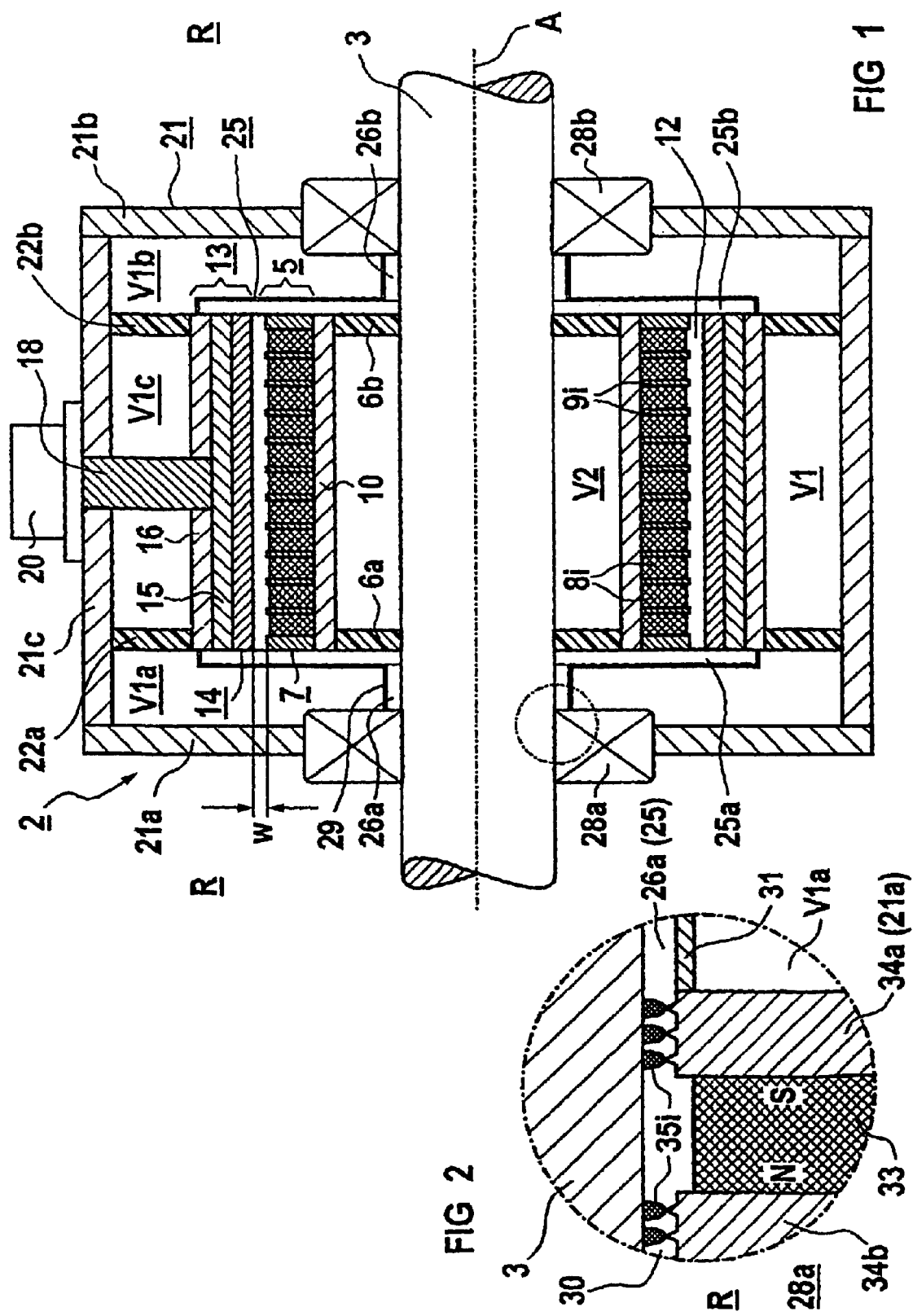

MAGNETIC BEARING FOR SUSPENDING A ROTATING SHAFT USING HIGH $T_C$ SUPERCONDUCTING MATERIAL

CROSS REFERENCE TO RELATED APPLICATIONS

This application is based on and hereby claims priority to PCT Application No. PCT/DE0/03173 filed on 20, Aug. 2001 and German Application No. 100 42 962.9 filed on 31, Aug. 2000.

BACKGROUND OF THE INVENTION

The invention relates to a magnetic bearing where a shaft which can rotate is borne magnetically within a stator. The magnetic bearing is intended to have the following features:
- a first bearing part is rigidly connected to the shaft and is surrounded by a second bearing part, which is associated with the stator, forming a bearing gap between these bearing parts,
- the first bearing part contains a magnet arrangement with permanently magnetic elements,
- the second bearing contains a superconducting arrangement with a high-$T_c$ superconductor material, with magnetic bearing forces being produced between the superconducting arrangement and the permanently magnetic elements of the magnet arrangement, and
- a cooling apparatus is provided for cooling the superconductor material of the superconducting arrangement to an operating temperature below the critical temperature of the superconductor material.

A magnetic bearing such as this is disclosed in DE 44 36 831 C2.

Magnetic bearings allow moving parts to be provided with bearings which make no contact and are therefore free of wear. They require no lubricants and can be constructed to have low friction. In this case, a body which can rotate (rotating body) can be hermetically sealed, that is to say in a vacuum-tight manner, from the outer area surrounding it.

Known magnetic bearings use magnetic forces between stationary electromagnets on a stator and ferromagnetic elements, which are on a rotor body and rotate with it. With this type of bearing, the magnetic forces are always attractive. In consequence, it is in principle impossible to achieve a bearing which is inherently stable in all three spatial directions (see "Eamshaw's Theorem" in "Trans. Cambridge Phil. Soc.", Vol. 7, 1842, pages 97 to 120). Magnetic bearings such as these therefore require active bearing control, which uses position sensors and a control loop to control the currents and the supporting magnets and to counteract any discrepancies of the rotor body from a nominal position. The control process, which needs to have a plurality of channels for this purpose, requires complex power electronics. In addition, a mechanical emergency bearing must be provided as a precaution against sudden failure of the control loop. Corresponding magnetic bearings are used, for example, in turbo-molecular pumps, ultra-centrifuges, high-speed spindles for machine tools, and X-ray tubes with rotating anodes; use for motors, generators, turbines and compressors is likewise known.

In principle, superconductors allow a new type of magnetic bearing: one of the bearing parts is in this case formed with permanently magnetic elements which induce shielding currents in the event of a position change, as a consequence of field changes in the superconductor material of a further, second bearing part which surrounds the first bearing part with a gap. The forces which result from this may be repulsive or attractive, but are directed such that they counteract the deflection from a nominal position. In contrast to known magnetic bearings, it is possible in this case to achieve an inherently stable bearing (see, for example, "Appl. Phys. Lett.", Vol. 53, No. 16, 1988, pages 1554 to 1556). In contrast to known magnetic bearings, there is no need here for any complex control system that is susceptible to defects; however, a cooling apparatus must be provided in order to cool the superconductor material to an operating temperature below the critical temperature of the superconductor material.

Appropriate superconducting bearing parts for magnetic bearings such as these may be one of the first fields of use for the metal-oxide high-$T_c$ superconductor materials which have been known since 1987, such as those based on the Y-Ba-Cu-O material system, which can be cooled to an operating temperature of about 77 K using liquid nitrogen.

Use of appropriate high-$T_c$ superconductor material is envisaged for the magnetic bearing which is disclosed in the DE-C2 document cited initially. The magnetic bearing contains a large number of permanently magnetic elements which are in the form of annular discs and are located one behind the other in the axial direction on a rotor shaft. These elements are polarized such that the polarization alternates when seen in the axial direction of the shaft. Comparatively thin ferromagnetic intermediate elements are arranged in each case between adjacent elements. These intermediate elements primarily have the task of magnetically concentrating the magnetic lines of force of adjacent permanently magnetic elements, so that a particularly high magnetic field strength is produced on the side of each intermediate element which faces the bearing gap. This bearing part of the rotor body, together with its magnet arrangement composed of permanently magnetic elements, is surrounded by a fixed-position bearing part of a stator. This bearing part contains a superconducting arrangement with a high-$T_c$ superconductor material such as $Yba_2Cu_3O_x$, with the abovementioned magnetic bearing forces being produced between the superconducting arrangement and the permanently magnetic elements of the magnet arrangement. The superconductor material of the conductor arrangement is kept at about 77 K by liquid nitrogen ($LN_2$). For this purpose, cooling channels through which this coolant is passed are provided on the outside of the superconducting arrangement.

In the case of magnetic bearings in which parts which need to be cryogenically cooled are adjacent to the bearing gap, one problem that can occur is that environmental air can reach the cold components through the bearing gap, with the moisture in the air freezing there. Corresponding icing can lead to functional restrictions or damage to the bearing. In the case of the magnetic bearing which is disclosed in the abovementioned DE-C2 document, such icing of the bearing gap can be avoided by emitting vaporizing nitrogen. The necessary cooling power for the bearing is in this case from a few watts up to the order of magnitude of 10 W at 50 to 80 K. However, if other cooling techniques than those used for the known magnetic bearings are envisaged, especially using so-called cryogenic coolers with only indirect cooling, there is no corresponding capability to avoid the risk of icing in the bearing gap, since no vaporizing coolant gas is then available.

SUMMARY OF THE INVENTION

One possible object of the present invention is therefore to refine the magnetic bearing having the features mentioned initially, such that such risk of bearing icing is minimized irrespective of the chosen cooling technique, and such that the sealing complexity can be kept low.

This object may be achieved in that, in the case of the magnetic bearing having the features mentioned initially, the superconducting arrangement and the magnetic arrangement are also jointly surrounded by at least one isolation area, and in that an additional area is provided, which is separated from the at least one isolation area and comprises the bearing gap and subareas which extend on side end faces of the superconducting arrangement and of the magnet arrangement radially as far as the shaft and are sealed there with respect to the shaft.

The advantages which are associated with this embodiment of the magnetic bearing are, in particular, that the complexity for sealing the additional area from the parts which can rotate can be kept low. This is because the seal uses the smallest possible diameter, so that the circumferential speed of the parts of the seal which also rotate is minimized. This makes it simpler for the seal to operate, and correspondingly lengthens its life. The simplified sealing, which may thus also be designed to be effective, of the additional area also results in the risk of ingress of gases which can freeze at least largely being avoided.

The additional area of the magnetic bearing can thus be evacuated in a simple manner. This advantageously allows friction losses to be reduced. In the event of any leakage of the sealant on the shaft, a small amount of air could admittedly in theory enter, however, severe icing is counteracted by the fact that, in this case, even a defective seal still provides a major impediment to the exchange of air, especially because the corresponding flow cross sections of the side subareas can be kept small. The magnetic bearing therefore has good emergency running characteristics.

Instead of this, it is particularly advantageous to fill the additional area with a dry barrier gas. Any gas or gas mixture which has no components that freeze at the operating temperature in the area of the bearing gap is suitable for use as the dry barrier gas. Appropriate barrier gases can be chosen from the group of helium, neon, argon or nitrogen, with a gas mixture having at least one of these gases also being suitable. If the additional area is filled with a gas, then the temperature decreases from the hot shaft toward the cold bearing gap in the side subareas, which can advantageously be formed with a small cross section, without any thermal losses occurring due to convection. This is because convection is avoided by the hot end of the side subareas filled with gas whose density is less being located closer to the shaft. The centrifugal force then results in stable layering during rotation. Furthermore, it should be regarded as being particularly advantageous that operation is also possible with slightly fluctuating pressures in the gas area, so that gas losses due to leakages, for example in the sealing area, are tolerable within wide limits. Depending on the requirement for the applications, the gas pressure may be below 1 bar, around 1 bar or more than this, so that especially in the latter case entry of moist air with ice formation in the cold area is reliably prevented.

In order to provide effective thermal isolation for those parts of the magnetic bearing which need to be cooled, it is possible, in particular, to evacuate the at least one isolation area. Instead, or preferably in addition to this, this area can also at least partially be filled with at least one isolation means, which is known per se.

It should also be regarded as particularly advantageous that the cooling apparatus for the magnetic bearing has at least one cryogenic cooler with at least one cold head. This cold head is then thermally coupled to the superconducting arrangement, preferably via at least one thermally conductive body, in order to provide indirect cooling for the superconducting arrangement. The use of such a cryogenic cooler has the advantage that the cooling power is available virtually at the push of a button, and there is no need to handle cryogenic liquids. In this case, indirect cooling by thermal conduction to the cold head is sufficient for effective cooling of the known high-$T_c$ superconductor materials. If a cryogenic cooler is used, it is admittedly not possible to prevent icing of the bearing gap by the emergence of vaporizing cooling gas such as nitrogen. Furthermore, thermal isolation of the superconductor material in the bearing gap would result in considerably enlargement of the bearing gap and would thus also result in a corresponding drastic reduction in the supporting force and stiffness of the bearing. For good operation, the bearing gap should, however, be as small as possible and, for example, should be in the order of magnitude of 1 mm. If the bearing were to be placed completely in an isolating vacuum vessel for this purpose, then this in principle would have to be sealed from the rotating shaft by two hermetic seals. This would in fact have the disadvantage that the vacuum would break down in the event of leakage, correspondingly interfering with the operation of the bearing and of the machine parts being borne.

In this case, the permanently magnetic elements would then be cooled down slowly essentially by heat radiation to an intermediate temperature between the operating temperature of the superconductor material and the outside temperature. The configuration of the special additional area, which is separated from the isolation area which jointly surrounds the superconducting arrangement and the magnetic arrangement, advantageously, however, allows the corresponding sealing problems to be overcome since—as already stated—the sealing of the additional area is subject to considerably less stringent requirements. Even indirect cooling can therefore also be used without any problems.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a longitudinal section through the magnetic bearing, and

FIG. 2 shows a detailed view of a sealing apparatus for the magnetic bearing as shown in FIG. 1.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Corresponding parts are provided with the same reference symbols in the figures.

The magnetic bearing, which is annotated in general by 2 in FIG. 1, is based on an embodiment as is disclosed in the cited DE 44 36 831 C2. The bearing is intended to be used as a magnetic bearing for a rotor shaft 3 (which can rotate), which may be composed of a nonmagnetic material such as an appropriate steel. For example, the shaft 3 is part of an electrical machine such as a generator, which is not shown in the figure. It has an associated first bearing part 5, which rotates with it and surrounds it concentrically in the bearing area. This bearing part is mounted rigidly on the shaft 3 via mounting elements 6a and 6b, which are in the form of discs and may advantageously be composed of poorly thermally conductive material such as GFC, for minimal heat introduction. According to the cited DE-C2 document, the first bearing part 5 contains a magnet arrangement 7 with elements 8i which are in the form of annular discs and are composed of permanently magnetic material. These elements are magnetically polarized alternately when seen in the axial direction and are separated from one another by intermediate elements 9i which are in the form of annular discs and are composed of ferromagnetic material such as iron. The ferromagnetic material of these intermediate elements is used to concentrate the magnetic flux on the cylindrical outer surface of the first bearing part 5, thus increasing the supporting force of the magnetic bearing. All the elements 8i and 9i are arranged in the form of a stack one behind the other in a supporting body 10, which ensures the drive connection to the shaft 3 via the mounting elements 6a and 6b which are in the form of discs.

In the first bearing part 5, which rotates with the shaft and has the permanently magnetic elements 8i, is separated by an air gap 12, surrounded by a second hollow-cylindrical, fixed-position bearing part 13, in which case the gap width w may be in the order of magnitude of a few millimeters. The fixed-position bearing part 13 which forms a stator has a hollow-cylindrical superconducting arrangement with one of the known high-$T_c$ superconductor materials on its inside facing the first bearing part 5, which can be kept at an operating temperature below its critical temperature during operation. When the position of the permanently magnetic elements 8i changes, this results in field changes which induce shielding currents in this superconductor material, which lead to the desired magnetic bearing forces between the bearing parts 5 and 13.

The hollow-cylindrical superconducting arrangement 14 of the fixed-position second bearing part 13 is mounted within a supporting body 16 on its side facing away from the bearing gap 12 via an intermediate cylinder 15 composed of a thermally highly conductive material such as copper. In order to cool it, the superconducting arrangement is thermally coupled via a thermally conductive body 18 to a cold head 20 of a cryogenic cooler, which is not shown in any more detail. Appropriate cryogenic coolers have a closed compressed gas circuit in particular for helium gas and are, for example, of the Gifford-McMahon or Stirling type, or are in the form of so-called pulsed-tube coolers. Appropriate cryogenic coolers are generally known. They may in particular be in the form of so-called regenerative coolers (based on the normal classification of cryogenic coolers) with a regenerator or a regenerative operating cycle (see the "Proceedings 16$^{th}$ Int. Cryog. Engng. Conf. (ICEC 16)", Kitakyushu, JP, 20.–24.05.1996, Verlag Elsevier Science, 1997, pages 33 to 44; "Adv. Cryog. Engng.", Vol. 35, 1990, pages 1191 to 1205 or U.S. Pat. No. 5,335,505).

The cold head 20 is located on the outside of a bearing housing 21, which completely surrounds the bearing 2 and is at room temperature. The fixed-position bearing part 13 is mounted on the inside of this bearing housing via mounting elements 22a and 22b which are in the form of annular discs. In order to ensure that a minimum amount of heat is introduced, these mounting elements are preferably composed of a poorly thermally conductive material such as GFC. For thermal insulation reasons, at least one part of the interior of the housing 21 is in the form of at least one thermal isolation area, at least the majority of which surrounds the unit comprising the superconducting arrangement 14 and the magnet arrangement 7. In particular, as assumed in the following text, this area may be evacuated. Instead of this, or advantageously in addition to it, this area may be at least partially filled with at least one thermal isolation substances. Suitable isolation substances are, for example, insulating foam, super insulation, insulating flakes or glass fibers. According to the illustrated embodiment, two vacuum areas V1 and V2, which are separated from one another, should be provided for thermal isolation. In this case, the vacuum area V1 comprises two side areas V1a and V1b and a radially externally located area V1c, which is located between the fixed-posibon second bearing part 13 and the radially external part of the vacuum housing 21. The vacuum area V2 is located between the shaft 3 and the first bearing part 5 which rotates with it, and is bounded at the side by the mounting elements 6a and 6b. It thus rotates with these parts. In contrast to the chosen illustration, the vacuum areas V1 and V2 may also be at least partially filled with one of the thermal isolation substance which are known per se, such as super insulation or insulation foam.

There is advantageously no need to seal the vacuum area V1 from the rotating shaft 3 in one refinement of the magnetic bearing. This is because, the bearing gap 12 which is formed between the fixed-position second bearing part 13 and the first bearing part 5 which rotates with the shaft and has a narrow gap width w should not be connected to the vacuum area V1. Rather, the intermediate area of the bearing gap should be part of a (further) additional area 25, which is sealed on the shaft. For this purpose, the area of the bearing gap 12 at its axial side ends in each case opens into subareas 25a and 25b which extend radially as far as the shaft 3. These subareas, which each contain a space in the form of an annular disc, are advantageously kept very narrow in the axial direction. On the shaft, they merge into sealing gaps 26a and 26b which lead axially to the exterior and are parts of sealing apparatus 28a and 28b, respectively. The additional area 25 may be evacuated or may be filled with a dry barrier gas, such as nitrogen. The gas pressure is generally between 0.1 and 10 bar, with a pressure which is slightly greater than the normal pressure being particularly advantageous. The sealing apparatuses 28a and 28b are not shown in any more detail in FIG. 1. Details of them can be seen in FIG. 2.

As can be seen from the detailed illustration in FIG. 2, with regard to one of the sealing apparatuses, for example with regard to the apparatus 28a, the associated sealing gap 26a opens into the outer area R which surrounds the bearing housing 21 with the magnetic bearing 2, and is generally at room temperature and normal pressure. In order to provide a seal from this outer area, at least one sealing element 30 of the sealing apparatus 28a is located in the sealing gap 26a and is in the form, for example, of a ferrofluid sealing element (see DE 20 34 213 A). The sealing apparatus 28a therefore comprises a permanent magnet 33 with magnet poles N and S as well as two yoke limbs 34a and 34b which are fitted to them at the sides and which carry the magnetic flux. The yoke limbs are provided with points in the area of the sealing gap 26a on their side facing the shaft, on each of which a ferrofluid ring 35i is held magnetically. The shaft 3 must be ferromagnetic for this purpose, at least in the area of the respective sealing element 30. For example, for this reason, a hollow tube which is not shown in the figure that is composed of ferromagnetic material is pushed over the shaft, which is manufactured from nonmagnetic material.

Instead of this indicated type of sealing apparatus, other known embodiments such as labyrinth seals or gap seals may also be used. An appropriate seal is provided for sealing apparatus 28*b* with its sealing gap 26*b*.

As can also be seen from the detailed illustration in FIG. 2, the vacuum area V1 or its subarea V1*a* is terminated in the area of the shaft 3 by a fixed-position wall 31 of the sealing gap 26*a* and by the yoke limb 34*a*. The yoke limb in this case represents a lengthened part of the side wall 21*a* of the bearing housing 21. However, instead of this, it is also advantageously possible to allow the side wall 21*a* to run as far as the wall 31 and to fit the sealing apparatus 28*a* to the side wall 21*a* at the side, for example by flange-connecting in a vacuum-tight manner by an O-ring.

One advantageous feature is that none of these embodiments of the magnetic bearing result in any sealing problems between the isolating vacuum area V1 or isolation area and rotating parts. All that is therefore required from the bearing is that the bearing gap 12 to the shaft 3 be sealed in a manner which is less problematic and is less complex.

The invention has been described in detail with particular reference to preferred embodiments thereof and examples, but it will be understood that variations and modifications can be effected within the spirit and scope of the invention.

What is claimed is:

1. A magnetic bearing to magnetically support a shaft for rotation within a stator, comprising:
   a first bearing part rigidly connected to the shaft;
   a second bearing part associated with the stator, the second bearing part surrounding the first bearing part with a bearing gap between the first and second bearing parts;
   a magnet arrangement with permanently magnetic elements, provided in the first bearing part;
   a superconducting arrangement with a high-$T_c$ superconductor material, provided in the second bearing part, the superconducting arrangement and the permanently magnetic elements of the magnet arrangement creating magnetic bearing forces therebetween;
   a cooling apparatus to cool the superconductor material of the superconducting arrangement to an operating temperature below a critical temperature of the superconductor material;
   subareas which extend on side end faces of the superconducting arrangement and of the magnet arrangement radially as far as the shaft and which are sealed there with respect to the shaft; and
   at least one isolation area jointly surrounding the superconducting arrangement and the magnet arrangement and separated from the bearing gap and the sub areas.

2. The magnetic bearing as claimed in claim 1, wherein the bearing gap and the subareas are filled with a dry barrier gas.

3. The magnetic bearing as claimed in claim 2, wherein the barrier gas is at least one gas selected from the group consisting of helium, neon, argon and nitrogen.

4. The magnetic bearing as claimed in claim 2, wherein the barrier gas is at a pressure of between 0.1 and 10 bar.

5. The magnetic bearing as claimed in claim 3, wherein the barrier gas is at a pressure of between 0.1 and 10 bar.

6. The magnetic bearing as claimed in claim 5, wherein the bearing gap and the subareas are evacuated.

7. A magnet device as claimed in claim 6, wherein the at least one isolation area is evacuated.

8. The magnet device as claimed in claim 7, wherein the at least one isolation area is at least partially filled with at least one isolation substance.

9. The magnetic bearing as claimed in claim 8, wherein the at least one isolation substance is selected from the group consisting of insulating foam, superinsulation, isolating flakes and glass fibers.

10. The magnet device as claimed in claim 9, further comprising:
    a bearing housing at room temperature; and
    poorly thermally conductive mounting elements provided within the bearing housing to mount the superconducting arrangement.

11. The magnetic bearing as claimed in claim 10, further comprising poorly thermally conductive mounting elements to mount the magnet arrangement on the shaft.

12. The magnetic bearing as claimed in claim 11, wherein the at least one isolation area comprises a closed isolation area which bounds the first bearing part and the shaft and rotates.

13. The magnetic bearing as claimed in claim 12, wherein
    the magnetic bearing further comprises a sealing apparatus arranged on each side of the shaft, and
    the subareas each open into an axial sealing gap which surrounds the shaft and is connected to a corresponding sealing apparatus.

14. The magnetic bearing as claimed in claim 13, wherein each sealing apparatus has at least one seal selected from the group consisting of ferrofluid seals, labyrinth seals and gap seals.

15. The magnetic bearing as claimed in claim 14, wherein the cooling apparatus has at least one cryogenic cooler with at least one cold head.

16. The magnetic bearing as claimed in claim 15, wherein the cryogenic cooler is selected from the group consisting of a Gifford-McMahon cooler, a Stirling cooler, and a pulsed-tube cooler.

17. The magnetic bearing as claimed in claim 16, wherein the cold head is thermally coupled to the superconducting arrangement via at least one thermally conductive body.

18. The magnetic bearing as claimed in claim 1, wherein the bearing gap and the subareas are evacuated.

19. A magnet device as claimed in claim 1, wherein the at least one isolation area is evacuated.

20. The magnet device as claimed in claim 1, wherein the at least one isolation area is at least partially filled with at least one isolation substance.

21. The magnetic bearing as claimed in claim 20, wherein the at least one isolation substance is selected from the group consisting of insulating foam, superinsulation, isolating flakes and glass fibers.

22. The magnet device as claimed in claim 1, further comprising:
    a bearing housing at room temperature; and
    poorly thermally conductive mounting elements provided within the bearing housing to mount the superconducting arrangement.

23. The magnetic bearing as claimed in claim 1, further comprising poorly thermally conductive mounting elements to mount the magnet arrangement on the shaft.

24. The magnetic bearing as claimed in claim 1, wherein the at least one isolation area comprises a closed isolation area which bounds the first bearing part and the shaft and rotates.

25. The magnetic bearing as claimed in claim 1, wherein the magnetic bearing further comprises a sealing apparatus arranged on each side of the shaft, and the subareas each open into an axial sealing gap which surrounds the shaft and is connected to a corresponding sealing apparatus.

26. The magnetic bearing as claimed in claim 25, wherein each sealing apparatus has at least one seal selected from the group consisting of ferrofluid seals, labyrinth seals and gap seals.

27. The magnetic bearing as claimed in claim 1, wherein the cooling apparatus has at least one cryogenic cooler with at least one cold head.

28. The magnetic bearing as claimed in claim 27, wherein the cryogenic cooler is selected from the group consisting of a Gifford-McMahon cooler, a Stirling cooler, and a pulsed-tube cooler.

29. The magnetic bearing as claimed in claim 27, wherein the cold head is thermally coupled to the superconducting arrangement via at least one thermally conductive body.

* * * * *